United States Patent
Sun (10) Patent No.: US 7,219,224 B1
(45) Date of Patent: May 15, 2007

(54) METHOD AND APPARATUS FOR TRANSFERRING FRAGMENTED AUDIO/VIDEO CONTROL COMMANDS USING AN INDEPENDENT SOFTWARE LAYER

(75) Inventor: Jadie Soo Sun, Belmont, CA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 928 days.

(21) Appl. No.: 09/595,498

(22) Filed: Jun. 16, 2000

(51) Int. Cl.
*H04L 29/00* (2006.01)
*H04L 9/00* (2006.01)

(52) U.S. Cl. .................. 713/151; 713/160; 713/161; 709/229; 709/230

(58) Field of Classification Search ............. 713/156, 713/168, 151, 202, 160, 161, 189, 193; 709/230, 709/235, 236, 229, 232, 238; 370/395.64, 370/474, 395.6, 469; 705/51; 725/90
See application file for complete search history.

(56) References Cited

U.S. PATENT DOCUMENTS

| | | | | |
|---|---|---|---|---|
| 5,678,002 A | * | 10/1997 | Fawcett et al. ............. | 715/709 |
| 5,764,890 A | * | 6/1998 | Glasser et al. .............. | 713/202 |
| 6,076,114 A | * | 6/2000 | Wesley ....................... | 709/235 |
| 6,094,435 A | * | 7/2000 | Hoffman et al. ............ | 370/414 |
| 6,208,804 B1 | * | 3/2001 | Ottesen et al. .............. | 386/125 |
| 6,577,596 B1 | * | 6/2003 | Olsson et al. ............... | 370/230 |
| 6,654,811 B1 | * | 11/2003 | Chaskar et al. ............. | 709/236 |
| 6,701,375 B1 | * | 3/2004 | Walker et al. .............. | 709/243 |
| 6,714,985 B1 | * | 3/2004 | Malagrino et al. .......... | 709/236 |
| 6,747,979 B1 | * | 6/2004 | Banks et al. ................ | 370/401 |
| 6,857,023 B2 | * | 2/2005 | Rivadalla et al. ........... | 709/230 |
| 6,983,371 B1 | * | 1/2006 | Hurtado et al. ............. | 713/189 |
| 2002/0003795 A1 | * | 1/2002 | Oskouy et al. ............. | 370/389 |

OTHER PUBLICATIONS

Fred Halsall, "Data Communications, Computer Networks and Open Systems", Fourth edition, Addison-Wesley Publication Company, pp. 13-15 and 168-171.*
"Microsoft Windows NT Server Networking Guide", Windows NT Server Version 4.0, Microsoft Press, pp. 14-20.*
Helen Custer, "Inside Windows NT", Microsoft Press, 289291.*

* cited by examiner

Primary Examiner—Gilberto Barron, Jr.
Assistant Examiner—A. Nobahar (57) ABSTRACT

An apparatus and method for sending and receiving fragmented Audio/Video Control packets using a communication software layer that is separate from a processing software layer. The method and apparatus may be used in a system for transferring copy protected digital audio/video signals between devices. In one embodiment of the present invention, a connection is established between a source and a sink device. Next, a communication layer of code on the source device receives at least one packet of data from the sink device. Next, the communication software on the source sends to the sink a response for each of the packets of data. Next, this embodiment of the source communication software sends all the packets as one group to a processing layer of code on the source device.

23 Claims, 5 Drawing Sheets

METHOD AND APPARATUS FOR TRANSFERRING FRAGMENTED AUDIO/VIDEO CONTROL COMMANDS USING AN INDEPENDENT SOFTWARE LAYER

FIELD OF THE INVENTION

The present invention relates to the field of digital audio/video signal transmission. Specifically, the present invention relates to a method and apparatus for sending and receiving fragmented Audio/Video Control packets, using a software layer which is separate from the authentication and key exchange layer.

BACKGROUND ART

Recent advances in digital technology have led to impressive new devices, such as Digital Versatile Disk (DVD) players, Digital TVs, and PCs which are capable of playing movies. However, at the same time these gains have lead to increasing concerns regarding the transmission of copy-protected material between such devices. In particular, the unauthorized copying, intercepting, and tampering of audio and video content presents concerns. The specification entitled, 'The Digital Transmission Content Protection (DTCP) Specification' (developed by The Digital Transmission Licensing Administrator) defines a protocol for protecting against such concerns using cryptography.

In the conventional method described in the DTCP specification, when a receiving (sink) device wishes to receive a digital audio/video signal from a sending (source) device, the sink device must first be authenticated. After a device is authenticated, an encryption key is exchanged between the source and the sink device. This key is used to encrypt the signal at the source and decrypt the signal at the sink.

One conventional way to authenticate a device is for the source device to determine whether the sink device is compliant with a copy-protection protocol. In the conventional protocol defined in the DTCP specification, each compliant device is given a certificate, which the device stores and uses in the authentication process. For example, a source device, such as a television set-top box may wish to determine whether a receiving sink device, such as a DVD player or a VCR, complies with a copy protection protocol and hence warrants having copy-protected material sent to it.

Importantly, the conventional system described in the DTCP specification requires that the source and sink devices have the ability to send and receive packets of information of at least 32 bytes. As the certificates used in authentication are generally larger than this, the packets will generally be fragmented for transfer and de-fragmented upon reception. Sending and receiving these fragmented packets (e.g., AV/C commands and responses, as well as data such as certificates) complicates the programming when done conventionally.

One conventional method of implementing packet fragmentation and de-fragmentation is a state machine which moves through various states as the method proceeds. There may be a different set of states depending upon factors such as whether full or restricted authentication is being sought by a device. (For example, if the audio/video signal is to never be copied, the sink device may request full authentication. If the signal is copy-one-generation or no-more-copies, the sink may request either full or restricted authentication.) Sending and receiving fragmented packets only complicates the programming of the state machine. For a conventional method which integrates the function of sending and receiving packets of information into the authentication software, designing and testing the sending and receiving software is complex.

To simplify programming the devices, many software engineers fix the size of the packets which the device may send or receive. However, this can lead to performance problems. When two devices wish to exchange information, first they must determine the size of packets each is capable of exchanging. If one device has a fixed transfer size, naturally the other device will be limited to this size. Furthermore, in the future, the minimum size of packets which a device must be capable of transferring may be increased. Therefore, some conventional devices will fail to comply with the DTCP specification, and hence may be unable to operate with other devices.

SUMMARY OF THE INVENTION

Therefore, it would be advantageous, then, to provide a method and apparatus for efficiently sending and receiving audio/video control packets using an independent communication software layer. This method and apparatus should be operable in a system for transferring copy-protected digital audio/video signals between devices. What is further needed is a method and apparatus which has the flexibility to allow devices to negotiate the maximum packet size that may be transferred. What is even further needed is a method and apparatus which can be used in a device regardless of whether it is functioning as a source or as a sink, as well as devices which use full or restricted authentication. What is further needed is a method and apparatus which simplifies the state machine code in the authentication and key exchange (AKE) layer.

The present invention provides an apparatus and method for sending and receiving fragmented Audio/Video Control packets using a communication software layer that is independent from a processing software layer. The present invention has the flexibility to allow devices to establish the size of packet transfers. The present invention provides a method and apparatus which may be used with a device regardless of whether it is functioning as a source or sink, as well as whether full or restricted authentication is sought. The present invention provides a method and apparatus that simplifies the design and testing of the processing (e.g., AKE) layer of code. The present invention provides these advantages and others not specifically mentioned above but described in the sections to follow.

An apparatus and method for sending and receiving fragmented Audio/Video Control packets using a communication software layer that is independent from a processing software layer is disclosed. The method and apparatus may be used in a system for transferring copy protected digital audio/video signals between devices. In one embodiment of the present invention, a connection is established between a source and a sink device. Next, a communication layer of code on the source device receives at least one packet of data from the sink device. Next, the communication software on the source sends to the sink a response for each of the packets of data. Next, this embodiment of the source communication software sends all the packets as one group to a processing layer of code on the source device.

In another embodiment, the present invention determines whether the received packet is a fragmented packet. If it is, the communication software then stores the fragmented packet in a temporary buffer. Next, this embodiment determines whether the fragmented packet was the last packet sent. If so, the contents of the temporary buffer are sent to the processing layer of code.

In still another embodiment of the present invention, the devices negotiate the maximum size of the packets transferred during the authentication process, thus allowing for a flexible system.

In another embodiment of the present invention, the communication code is on a device functioning as a sink. Data packets are sent by the sink to a source device and responses are received by the sink from the source. When all packets have been sent by the sink, the sink sends a single response to the sink's processing layer of code.

DETAILED DESCRIPTION OF THE INVENTION

In the following detailed description of the present invention, an apparatus and method for sending and receiving fragmented Audio/Video Control packets using a communication software layer that is independent from a processing software layer, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Transferring Fragmented Audio/Video Control Commands Using an Independent Software Layer The present invention provides for an apparatus and method for sending and receiving fragmented Audio/Video Control packets using a communication software layer that is independent from a processing software layer. For example, the communication software layer may handle AV/C commands and responses, while the processing software handles authentication and key exchange (AKE). The present invention may be practiced within a system for transmitting copy protected digital audio/video signals between devices, such as set-top boxes, digital TV's, DVD players, digital VCRs, and the like.

Figure 1:
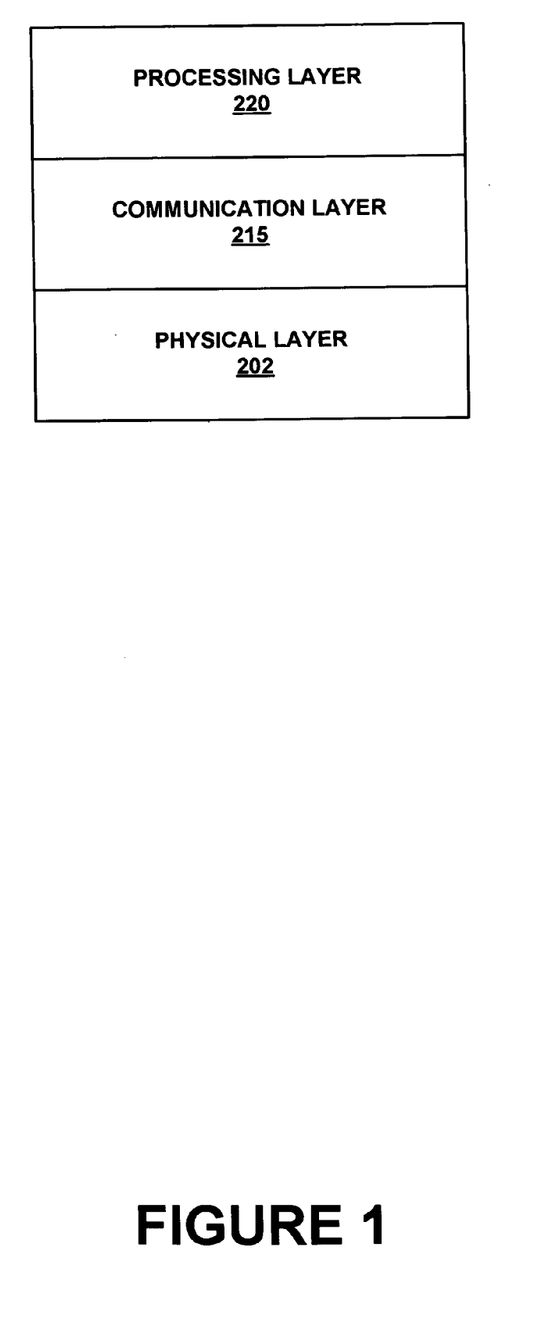
FIG. 1 is an illustration of functional layers, including a communication layer in which an embodiment of the present invention may be practiced.

FIG. 1 illustrates, conceptually, the various functional layers pertinent to the present invention. A communication software layer 215 is shown between a physical layer 202 and a processing software layer 220. In one embodiment, the physical layer 202 may be an IEEE 1394 serial bus and associated connections at the devices. In one embodiment, the communication software layer 215 is an AV/C command sending/receiving layer. This layer may be used to send and receive AV/C commands and responses as is described in the specification entitled, "Specification for AV/C Digital Interface Command Set" (1394 Trade Association). Additional AV/C commands may be found in Chapter 8 (AV/C Digital Interface Command Set Extensions) of the specification entitled, "The Digital Transmission Content Protection (DTCP) Specification" (developed by The Digital Transmission Licensing Administrator). However, the present invention is not to be limited to the communication code 215 transferring commands from either of these specifications.

The processing software layer 220, in one embodiment, is an AKE (authentication and key exchange layer). This layer may perform the functions described in the DTCP Specification. The steps of the present invention will generally be performed by the communication layer 215, which interfaces with the processing layer 220. The communication layer 215 and the processing layer 220 are independent from each other. The present invention is not limited to the communication layer 215 operating with a processing layer 220 which functions according to the DTCP specification.

Figure 2:
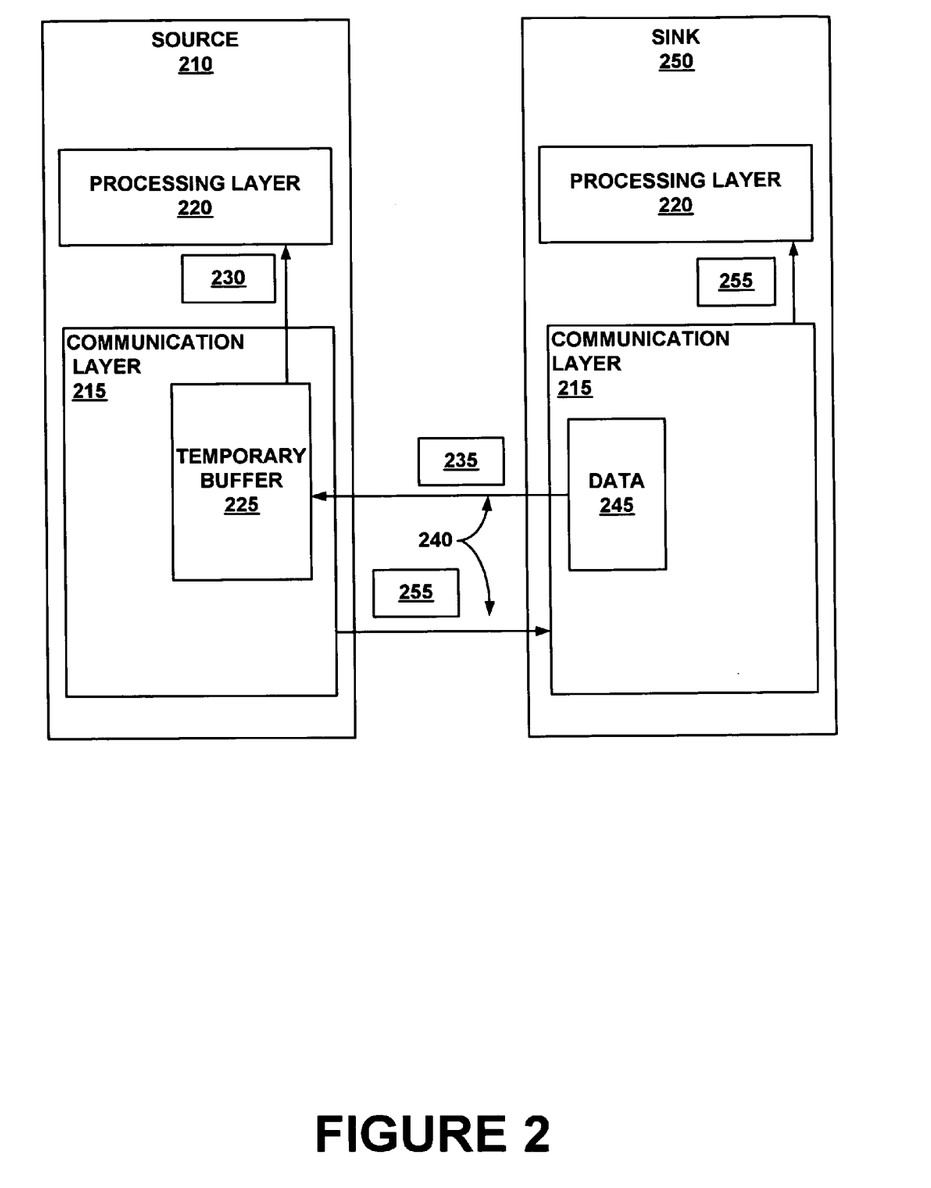
FIG. 2 is an illustration of exemplary sink and source devices which may send and receive AV/C packets, according to an embodiment of the present invention.

FIG. 2 illustrates exemplary source 210 and sink 250 devices shown exchanging information. Embodiments of the present invention may be practiced in either the source 210 or the sink 250 device. Furthermore, a single device may function as both a source 210 and a sink 250 device, in one embodiment. FIG. 2 shows both source device 210 and sink device 250 as having a communication layer of software 215 and a processing layer of software 220. As discussed with reference to FIG. 1, the communication layer 215 may be used for exchanging necessary commands and data between the source 210 and sink 250 devices, and the processing software layer 220 may be used for performing necessary authentication and/or key exchange (AKE).

Still referring to FIG. 2, the devices are connected by a link 240, which in one embodiment is an IEEE 1394 serial bus. However, the present invention is not limited to this type of link 240. The source 210 device's communication layer of code 215 has a temporary buffer 225, which is used to store fragmented information which is received from the sink device 250 over the link 240. For example, the sink device 250 may desire to be authenticated so that it may receive a copy protected audio/video signal from the source 210; therefore, the sink 250 sends a data packet 235 to the source 210. The data packet 235 may contain an AV/C command or response. The packet 235 may include data such as a certificate, which is used to authenticate a device. Furthermore, the packet 235 may be fragmented or unfragmented. For each packet 235 received by the source 210, the source 210 sends a response 255 to the sink 250. For example, the response may be an AV/C response that the command was accepted. After all packets 235 have been received, the source 210 transfers all packets together 230 up to the processing layer 220 in the source device 210.

Still referring to FIG. 2, the sink device 250 also has a layer of communication code 215. In one embodiment, the communication layer code 215 is the same regardless of whether the device functions as a source 210 or a sink 250. It is appreciated that some devices may function as either a source 210 or a sink 250. The illustration in FIG. 2 shows the communication layer 215 differently on the sink 250 for explanatory purposes. The complete authentication process may involve each device sending packets 235 (fragmented or not) and responses to the other device, although this is not shown on the illustration.

The communication layer of code 215 on the sink 210 receives a response 255 from the source 210 for each packet 235 it sends to the source 210. However, the sink 250 does not send a response 255 to the processing layer 220 until the sink 250 has transferred all data 245. (Data 245 may be AV/C commands and responses, as well as data such as certificates of information regarding a device's compliance with a copy protection scheme.) Thus, the processing layer 220 is ignorant to the fact that data 245 transfers may be fragmented. Even if a device functions as only a source 210 or only as a sink 250, the present invention is well suited to using the same communication code 215. Consequently, the design, testing and debugging of the communication code 215 is simplified. The processing layer of code 220 is also easier to design, test and debug, as it does not need to handle the communication transfers.

It will be borne in mind that the present invention may be practiced in just one of the two devices (source 210 or sink 250) shown in FIG. 2, with the other device using a different method to transfer and receive audio/video commands and responses. Thus, while in another embodiment, both source 210 and sink 250 practice the present invention, this is not essential to the present invention. In one embodiment, one device is referred to as a host device, in which the present invention may be practiced. The other device is referred to as a peripheral device, in which the present invention does not have to be practiced.

Figure 3:
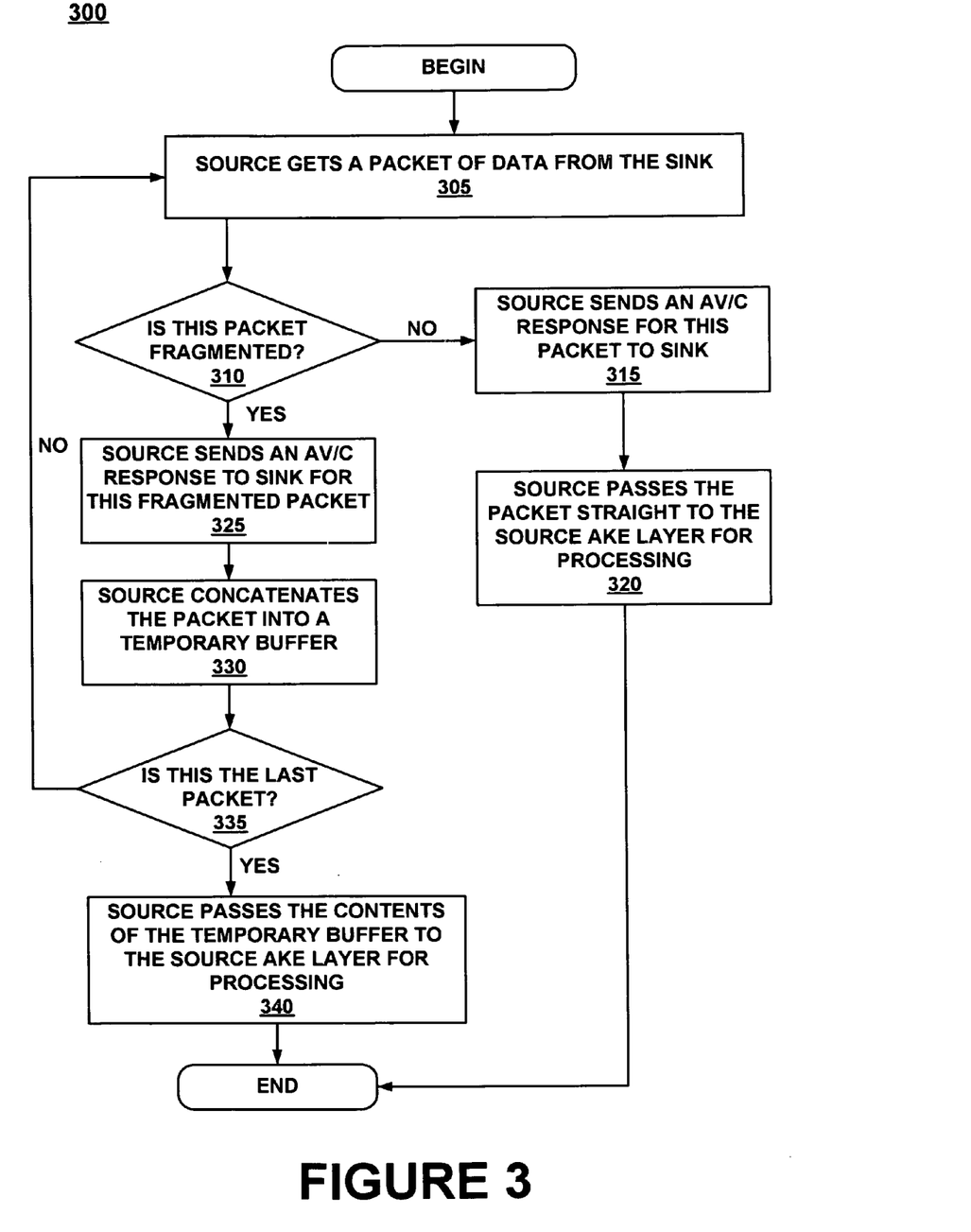
FIG. 3 is a flowchart illustrating the steps of a source receiving and sending fragmented AV/C packets, according to an embodiment of the present invention.

FIG. 3 is a flowchart 300 illustrating the steps of a source device 210 receiving data packets 235 from a sink device 250. In this embodiment, the communication layer 215 sends and receives AV/C commands and the processing layer 220 is described as an AKE layer. However, the present invention is not to be limited to sending/receiving AV/C commands and/or the processing layer being an AKE layer. In step 305, the source device 210 receives a data packet 235 from the sink device 250.

In step 310, the communication software 215 on the source device 210 determines whether the packet 235 is a fragmented one. This may be determined by checking a field of the received packet 235, as will be well understood by those in the art. For example, the receiving source device 210 may check a blocks_remaining field in an AV/C command, which indicates how many more command blocks are to be sent from the sink 250. Clearly, any number but zero indicates a fragmented command. However, the present invention is not limited to this technique.

If the packet 235 is not a fragmented one, then the source 210 sends an AV/C response to the sink 250, in step 315. Next, in step 320, the source 210 sends the packet 235 straight to the processing layer of software 220 on the source 210. In this embodiment, the processing layer is an AKE layer.

If the packet 235 is fragmented, then the communication software 215 on the source 210 sends an AV/C response for this fragment to the sink device 250, in step 325. Then, in step 330, the source device 210 stores the fragmented packet 235 in a temporary buffer 225. This temporary buffer 225 will contain all the fragments associated with this piece of information. For example, the fragments may comprise fragments of a certificate, which is used to authenticate a compliant device, such as a device which respects the 5C copy protection protocol.

The communication code 215 then determines, in step 335, whether the fragmented packet 235 was the last one which the sink device 250 will send. If not, the communication code 215 receives another packet 235 from the sink device 250, in step 305. The process is repeated until the last fragmented packet 235 is received. Then, in step 340, the source device 210 transfers the contents of the temporary buffer 225 to the processing layer 220 of the source device 210. The fact that the data transfers may be fragmented is hidden from the AKE (processing 230) layer. In this fashion, the processing layer 220. (e.g., AKE layer) receives the information in a single piece which greatly simplifies programming at that level.

Figure 4:
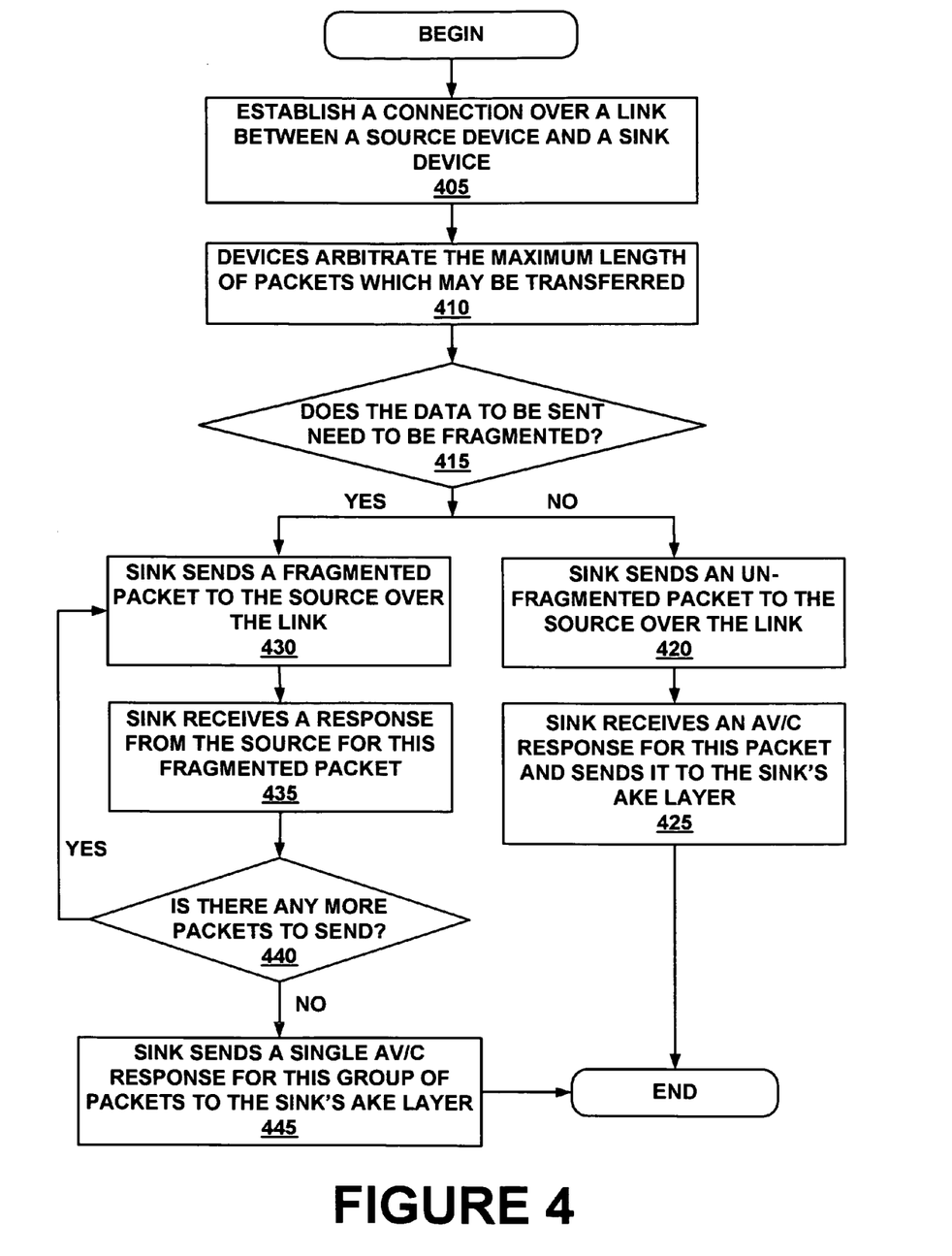
FIG. 4 is a flowchart illustrating the steps of a sink sending and receiving fragmented AV/C packets, according to an embodiment of the present invention.

FIG. 4 illustrates the steps of a sink device 250 sending packets 235 to the source device 210. As with flowchart 300 of FIG. 3, the packets 235 may be AV/C commands and responses and the processing 220 layer may be an AKE layer. In step 405, a connection is established between a source device 210 and a sink device 250 over a link 240. For example, the link may be an IEEE 1394 serial bus. In step 410, the source 210 and sink 250 devices arbitrate the maximum packet 235 length that may be transferred. In this fashion, it may be possible to transfer an entire certificate at once. However, this is not essential to the present invention. Furthermore, the present invention has the flexibility of arbitrating virtually any size of transfers.

In step 415, the communication software 210 on the sink device 250 determines whether the data 245 to be sent to the source device 210 needs to be fragmented. If not, then in step 420 the sink device 250 sends a single packet 235 to the source device 210. In step 425, the sink 250 receives a response (e.g., an AV/C response) from the source device 210 and passes this response up to the processing layer 230 (e.g., AKE layer). This ends the process for the un-fragmented packet 235 scenario.

If the packet 235 must be fragmented, then in step 430, the sink device 250 sends a fragmented packet 235 over the link 240 to the source device 210. In step 435, the communication code 215 on the sink 250 receives a response 255 from the source device 210 for the fragmented packet 235 just sent. Next, in step 440, the communication code 215 on the sink device 250 determines whether there are any more fragmented packets 235 to send. If so, the process is repeated from step 430. When there are no more packets to send, the communication code 215 on the sink device 250 sends a single response 255 to the processing layer 220 (e.g., an AKE layer) on the sink device 250, in step 445.

Figure 5:
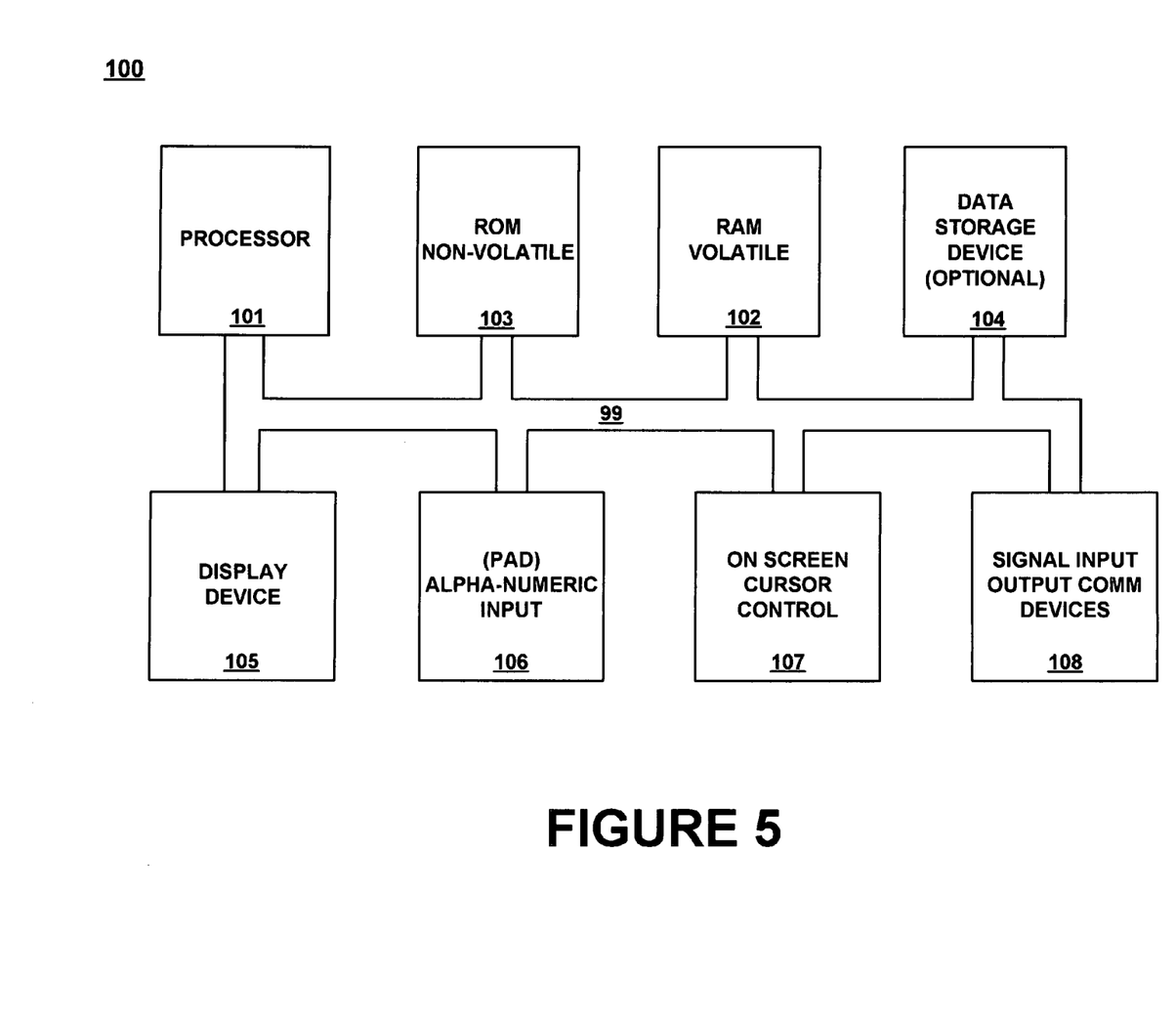
FIG. 5 is a schematic of a computer system, which may be used as platform to implement an embodiment of the present invention.

FIG. 5 illustrates circuitry of computer system 100, which may form a platform upon which to perform an embodiment of the present invention in one or more of the devices. Namely, the source 210 or sink 250 devices in FIG. 2 may include computer system 100. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Also included in computer system 100 of FIG. 5 is an optional alphanumeric input device 106. System 100 also includes an optional cursor control or directing device 107 coupled to the bus 99 for communicating user input information and command selections to the central processor 101. The display device 105 utilized with the computer system 100 may be a liquid crystal device, cathode ray tube (CRT), field emission device (FED, also called flat panel CRT) or other display device suitable for creating graphic images recognizable to the user. Signal communication device 108, also coupled to bus 99, can be a serial port. For example, this may be a port which allows the system 100 to connect to other systems via a IEEE 1394 serial cable. Although it will be understood that other links 240 may be used with the present invention.

The preferred embodiment of the present invention an apparatus and method for sending and receiving fragmented Audio/Video Control packets using a communication software layer that is independent from a processing software layer, is thus described. While the present invention has been described in particular embodiments, it should be appreciated that the present invention should not be construed as limited by such embodiments, but rather construed according to the below claims.

I claim:

1. In a first device for transferring a digital signal, a method of exchanging data between the first device and a second device comprising the steps of:
   a) establishing a connection, for transferring said digital signal comprising large packets, between said first device and said second device;
   b) negotiating the size of packets for transfer between said first device and said second device;
   c) in response to said negotiation, a communication layer of code coupled to said first device receiving a packet from said second device;
   d) in response to said received packet, said communication layer of code sending a response to said second device;
   e) repeating steps c) and d) until all packets from said second device are received; and
   f) said communication layer transferring all of said packets as a single group to a processing layer of code coupled to said first device, wherein said processing code and said communication code are independent from each other, and wherein said processing layer of code performs authentication and also determines compliance with a copy protection scheme.

2. The method of claim 1 wherein step c) comprises the steps of:
   c1) receiving a packet;
   c2) determining whether said packet is a fragmented packet;
   c3) if said packet is a fragmented packet, said communication layer of code storing said fragmented packet in a temporary buffer coupled to said first device; and
   c4) if said received packet was not the last packet to be received from said second device, repeating steps c1)–c3).

3. The method of claim 1, wherein step c) comprises the step of: c1) receiving an un-fragmented packet of data.

4. The method of claim 1 wherein said packet in step c) comprises an audio/video control (AV/C) command.

5. The method of claim 1 wherein step d) comprising the step of: d1) said communication layer of code sending an audio/video control (AV/C) response to said second device for each of said packets received in step c).

6. The method of claim 1 wherein said connection in step a) is made via an IEEE 1394 serial cable.

7. The method of claim 1 wherein said packet comprises information regarding said second device's compliance with a copy protection scheme.

8. In a first device for transferring a digital signal, a method of exchanging data between the first device and a second device comprising the steps of:
   a) establishing a connection, for transferring said digital signal comprising large packets, between said first device and said second device;
   b) a communication layer of code coupled to said first device negotiating the size of packets transferred between said first device and said second device;
   c) in response to said negotiation, said communication layer of code sending a packet of authentication information to said second device;
   d) in response to said received packet, said communication layer of code receiving a response from said second device;
   e) repeating steps c) and d) until all packets are sent; and
   f) said communication layer transferring a response to a processing layer of code coupled to said first device, wherein said communication layer of code and said processing layer of code are independent from each other, wherein said processing layer performs authentication and determines said second device's compliance with a copy protection scheme, and wherein fragmentation of said packets is transparent to said processing layer.

9. The method of claim 8 wherein said first device is a sink device and said second device is a source device.

10. The method of claim 8 wherein said packet in step c) comprises an audio/video control (AV/C) command.

11. The method of claim 8 wherein said response in step d) comprises a response to an audio/video control (AV/C) command.

12. A host device for processing digital audio/video signals comprising:
 a) a processor coupled to a bus;
 b) a memory coupled to said bus;
 c) a communication layer of code stored in said memory and, when run in said processor, operable to establish a connection for transferring said digital audio/video signals comprising large packets, and negotiate the size of packets transferred between said host device and a peripheral device, and said communication layer of code further operable to receive packets comprising authentication information from said peripheral device connected to said bus via a communication link; and
 (d) a processing layer of code stored in said memory and, when executed in said processor, operable to perform authentication and key exchange and further operable to determine said peripheral device's compliance with a copy protection scheme;
 said communication layer of code further operable to send a response to said peripheral device for each packet received from said peripheral device; and
 said communication layer of code further operable to send all received packets as a single group to said processing layer of code stored in said memory, wherein fragmentation of said packets comprising authentication information is transparent to said processing layer operable to perform authentication and key exchange.

13. The device for processing digital audio/video signals of claim 12 wherein:
 said host device further comprises a temporary buffer stored in said memory;
 wherein said communication layer of code is further operable to determine whether said packets received in step c) are fragmented packets; and
 wherein said communication layer of code is further operable to store said fragmented packets in said temporary buffer.

14. The device for processing digital audio/video signals of claim 12 wherein one of said packet in c) comprises an audio/video control (AV/C) command.

15. The device for processing digital audio/video signals of claim 12 wherein said response in d) comprises a response to an audio/video control AV/C command.

16. The device for processing digital audio/video signals of claim 12 wherein said host device is a sink device.

17. The device for processing digital audio/video signals of claim 12 wherein said host device is a source device.

18. The device for processing digital audio/video signals of claim 12 wherein said host device seeks full authentication.

19. The device for processing digital audio/video signals of claim 12 wherein said host device seeks restricted authentication.

20. The device for processing digital audio/video signals of claim 12 wherein said packets comprise information which defines that the peripheral device sending the packet is compliant with a copy protection scheme.

21. The method of claim 1, wherein said negotiating maximizes the size of packets for transfer between said first and said second device.

22. The method of claim 8, wherein said negotiating maximizes the size of packets for transfer between said first and said second device.

23. The device for processing digital audio/video signals of claim 12, wherein said negotiating maximizes the size of packets transferred between said host device and a peripheral device.

* * * * *